Patented July 11, 1939

2,165,592

UNITED STATES PATENT OFFICE 2,165,592

FERTILIZER AND METHOD OF MAKING SAME

Lewis Treeland, Kansas City, Kans.

No Drawing. Application June 21, 1937, Serial No. 149,438

4 Claims. (Cl. 71—24)

REISSUED
NOV 2 6 1940

This invention relates to a fertilizer and the method of making the same, and consists in a fertilizer made by impregnating an absorbent granular material with certain of the more volatile fertilizing ingredients, then coating said granules with a material to seal said certain ingredients in said granules, and intermixing this granular material in a mixture of super phosphate and black loam soil.

Much difficulty has been experienced in the use of commercial fertilizers due to the fact that certain of the elements, such as nitrogen and potash, have a tendency to cause a wilting or killing of the plants. This is due principally to the fact that too large a quantity of these ingredients are present and in direct contact with the plant. Furthermore, these ingredients, when in a free state, are quickly dissipated and lost. Other ingredients of the fertilizer are less active and need not be specially treated to prevent detrimental effects and loss.

It is the purpose of this invention to overcome the above difficulties and to produce a convenient fertilizer that retains its constituent parts for a long period of time and one that will not wilt or kill the plants.

It is the principal object of the present invention to produce a fertilizer comprising a plurality of ingredients, some of which are sealed within a granual material, and other being freely intermixed with said granules.

In the preparation of this fertilizer, an absorbent granular material, such as wood pulp, saw dust, etc., is thoroughly impregnated with a substantially saturated solution of sulphate of ammonia, muriate of potash and water. After the granules are thoroughly impregnated, any excess liquid is drained off and then the granules are intermixed with a composition consisting of about 90% of mineral black, a powdered graphite, or graphite shale, and 10% of carbon black to form a coating on the granules suitable for closing the pores of the granules to prevent rapid escape of the chemicals retained within the granules. This coating is not entirely impervious to water, but is sufficient to retain the chemicals and prevent any rapid dissipation thereof, and so long as the fertilizer is in storage and not subjected to the earth moisture, it will retain the granules in a substantially sealed condition for a long period of time.

This sealed and impregnated granular material is then intimately mixed with a composition of super phosphate and black loam soil. This composition consists of finely divided particles and serves as an absorbent for any of the moisture that might escape from the granules, and also has considerable fertilizing value.

It will be noted that within the coated granules the nitrogen and potash materials are encased. These ingredients, if present in too large quantities, are detrimental and cause a wilting of the plants. The phosphoric acid ingredient is freely mixed in the fertilizer and is adapted to be taken up by the plants in proper quantities as needed, without any detrimental effect to the plant when in excessive quantities.

The metal black and carbon black not only serve as a coating for the granules, but also provide essential elements for plant life.

After long tests, the following has been found to produce a very satisfactory fertilizer for lawns, etc.: twenty-five (25) pounds of sulphate of ammonia and eight (8) pounds of muriate of potash dissolved in water and incorporated into twenty-five (25) pounds of saw dust or wood pulp. To this impregnated saw dust is added two and one-half (2½) pounds of a composition consisting of 90% mineral black and 10% carbon black. After sufficient intermixing of this composition with saw dust, a thin coating of the composition covers the granules and serves as a partial coating to retain the chemicals within the granules of saw dust. Eighteen (18) pounds of super phosphate, which contains about 20% of phosphate, is thoroughly intermixed with twenty (20) pounds of any dry black loam soil. These ingredients are preferably finely ground, and are incorporated with the saw dust so as to obtain a uniform composition. The carbon and mineral black, when applied to the saw dust, present a smooth surfaced granule of relatively slight cohesive or adhesive property, thereby insuring a free mechanical mix of the fertilizer which will remain in a free and separable state suitable for spreading over the surface of the lawn.

For the various uses, fertilizers of different relative quantities of the ingredients may be used without departing from the spirit of this invention.

It will be noted that this fertilizer, among other ingredients, provides for an ample supply of nitrogen, potash and phosphoric acid which are often found depleted in many of our soils.

An analysis of any particular soil may be made to determine which elements are most needed and the fertilizer will be made to bring it up to a given standard for proper plant nourishment.

However, for general use, the composition set forth above is very satisfactory.

What I claim is:

1. A fertilizer comprising absorbent granules impregnated with sulphate of ammonia and muriate of potash and coated with a mixture of substantially 90% of mineral black and 10% of carbon black, used in an amount approximately 4% of the weight of the material being coated intermixed with a mixture of super phosphate and black loam soil.

2. A fertilizer comprising substantially 25 pounds of sulphate of ammonia and 8 pounds of muriate of potash, incorporated within the granules of 25 pounds granular wood pulp; a surface covering for said granules consisting of a mixture of ¼ pound of carbon black and 2¼ pounds of mineral black; and 18 pounds of twenty-percent super phosphate, and 20 pounds of black loam soil intermixed with said coated granules.

3. The method of making a fertilizer comprising impregnating an absorbent granular material with a solution of sulphate of ammonia and muriate of potash, intermixing and coating said impregnated granules with a mixture of substantially 90% of mineral black and 10% of carbon black used in an amount aproximately 4% of the weight of the material being coated, then intermixing said coated granules with a mixture of super phosphate and black loam soil.

4. The method of making a fertilizer comprising impregnating the granules of a mass of sawdust with a solution saturated with salts containing nitrogen and potassium in combined form, intermixing and coating said impregnated granules with a mixture of substantially 90% of mineral black and 10% of carbon black used in an amount approximately 4% of the weight of the material being coated, then intermixing said coated granules with finely divided mixture of super phosphate and black loam soil.

LEWIS TREELAND.